United States Patent
Kazmirski et al.

(10) Patent No.: US 9,033,121 B2
(45) Date of Patent: May 19, 2015

(54) HIGH VELOCITY COMPRESSION DAMPING VALVE

(75) Inventors: Karl C. Kazmirski, Temperance, MI (US); Darrell G. Breese, Ypsilanti, MI (US); Matthew L. Roessle, Temperance, MI (US); John McGahey, Trenton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 533 days.

(21) Appl. No.: 12/496,964

(22) Filed: Jul. 2, 2009

(65) Prior Publication Data

US 2010/0078275 A1    Apr. 1, 2010

Related U.S. Application Data

(60) Provisional application No. 61/100,321, filed on Sep. 26, 2008.

(51) Int. Cl.
| | | |
|---|---|---|
| *F16F 9/512* | (2006.01) | |
| *F16F 9/34* | (2006.01) | |
| *F16F 9/18* | (2006.01) | |
| *F16F 9/516* | (2006.01) | |
| *F16F 9/348* | (2006.01) | |

(52) U.S. Cl.
CPC ............ *F16F 9/512* (2013.01); *F16F 9/185* (2013.01); *F16F 9/34* (2013.01); *F16F 9/516* (2013.01); *F16F 9/348* (2013.01)

(58) Field of Classification Search
CPC ............ F16F 9/512; F16F 9/20; F16F 9/348; F16F 9/34; F16F 9/062; F16F 9/3484; F16F 9/3485; F16F 9/5126; F16F 9/516; B62D 7/22
USPC .................. 188/280, 322.14, 322.13, 322.15, 188/282.5, 315, 317
See application file for complete search history.

(56) References Cited

U.S. PATENT DOCUMENTS

| | | | | |
|---|---|---|---|---|
| 3,038,560 A | * | 6/1962 | Long, Jr. ..................... 188/280 |
| 3,209,868 A | * | 10/1965 | De Koning et al. ...... 188/322.14 |
| 3,519,109 A | * | 7/1970 | Whisler, Jr. ................ 188/269 |
| 4,076,276 A | * | 2/1978 | Wijnhoven et al. ........ 267/64.11 |

(Continued)

FOREIGN PATENT DOCUMENTS

| | | | | |
|---|---|---|---|---|
| DE | | 3109122 A1 | * 9/1982 | ............... F16F 9/34 |
| JP | UM-A-2-134342 | | 11/1990 | |

(Continued)

OTHER PUBLICATIONS

Search Report and Written Opinion in corresponding PCT application No. PCT/US2009/056342 dated Feb. 24, 2010.

(Continued)

*Primary Examiner* — Anna Momper
*Assistant Examiner* — San Aung
(74) *Attorney, Agent, or Firm* — Harness, Dickey & Pierce, P.L.C.

(57) ABSTRACT

A shock absorber includes a pressure sensitive valve assembly that controls fluid flow through the pressure sensitive valve assembly based upon the velocity of the piston assembly in the shock absorber. The pressure sensitive valve assembly restricts fluid flow as the velocity of the piston in a compression stroke increases to increase the damping loads provided by the shock absorber.

13 Claims, 11 Drawing Sheets

(56) References Cited

U.S. PATENT DOCUMENTS

| | | | |
|---|---|---|---|
| 4,633,983 A | | 1/1987 | Horvath et al. |
| 4,782,925 A | * | 11/1988 | Grundei .................... 188/322.14 |
| 5,333,708 A | * | 8/1994 | Jensen et al. ............. 188/322.14 |
| 5,992,585 A | * | 11/1999 | Kazmirski et al. ....... 188/322.14 |
| 6,382,372 B1 | * | 5/2002 | Keil et al. ................. 188/322.15 |
| 2008/0121478 A1 | * | 5/2008 | Maniowski et al. ....... 188/282.6 |

FOREIGN PATENT DOCUMENTS

| | | |
|---|---|---|
| JP | UM-A-7-18044 | 3/1995 |
| JP | 2002-188675 | 7/2002 |
| JP | 2008-82491 | 4/2008 |
| KR | 1998-0020258 | 6/1998 |
| KR | 2004-0052346 | 6/2004 |
| WO | 97-16656 | 5/1997 |

OTHER PUBLICATIONS

Office Action dated Aug. 28, 2013 in corresponding Japanese Patent Application No. 2011-529075 with English translation thereof.

\* cited by examiner

HIGH VELOCITY COMPRESSION DAMPING VALVE

CROSS-REFERENCE TO RELATED APPLICATIONS

This application claims the benefit of U.S. Provisional Application No. 61/100,321, filed on Sep. 26, 2008, the entire disclosure of which is incorporated herein by reference.

FIELD

The present disclosure relates generally to shock absorbers or dampers. More particularly, the present disclosure relates to a shock absorber or damper having a base valve assembly which includes a pressure sensitive valve assembly for high speed damping.

BACKGROUND

This section provides background information related to the present disclosure which is not necessarily prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the automobile.

The most common type of shock absorbers for automobiles is the dashpot type in which a piston is located within a pressure tube and is connected to the sprung mass of the vehicle through a piston rod. The piston divides the pressure tube into an upper working chamber and a lower working chamber. Because the piston, through valving, has the ability to limit the flow of damping fluid between the upper and lower working chambers within the pressure tube when the shock absorber is compressed or extended, the shock absorber is able to produce a damping force which counteracts the vibrations which would otherwise be transmitted from the unsprung mass to the sprung mass. In a dual tube shock absorber, a fluid reservoir is defined between the pressure tube and a reserve tube which is positioned around the pressure tube. A base valve is located between the lower working chamber and the fluid reservoir to also produce a damping force which counteracts the vibration which would otherwise be transmitted from the unsprung portion to the sprung portion of the automobile during stroking of the shock absorber.

Some applications or suspension systems that are developed could benefit by utilizing a displacement sensitive damping concept, a velocity sensitive damping concept and/or an acceleration sensitive concept.

SUMMARY

This section provides a general summary of the disclosure, and is not a comprehensive disclosure of its full scope or all of its features.

The present disclosure provides a shock absorber or damper which incorporates high speed damping by using a base valve assembly which increases the amount of damping load generated as the velocity of the piston increases during a compression stroke of the shock absorber or damper. A pressure responsive device is incorporated into the base valve assembly to increase the damping load in response to an increase in pressure of the working chamber caused by the increase in velocity of the piston in the pressure tube during a compression stroke.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The following description of the preferred embodiment(s) is merely exemplary in nature and is in no way intended to limit the invention, its application, or uses.

Figure 1:
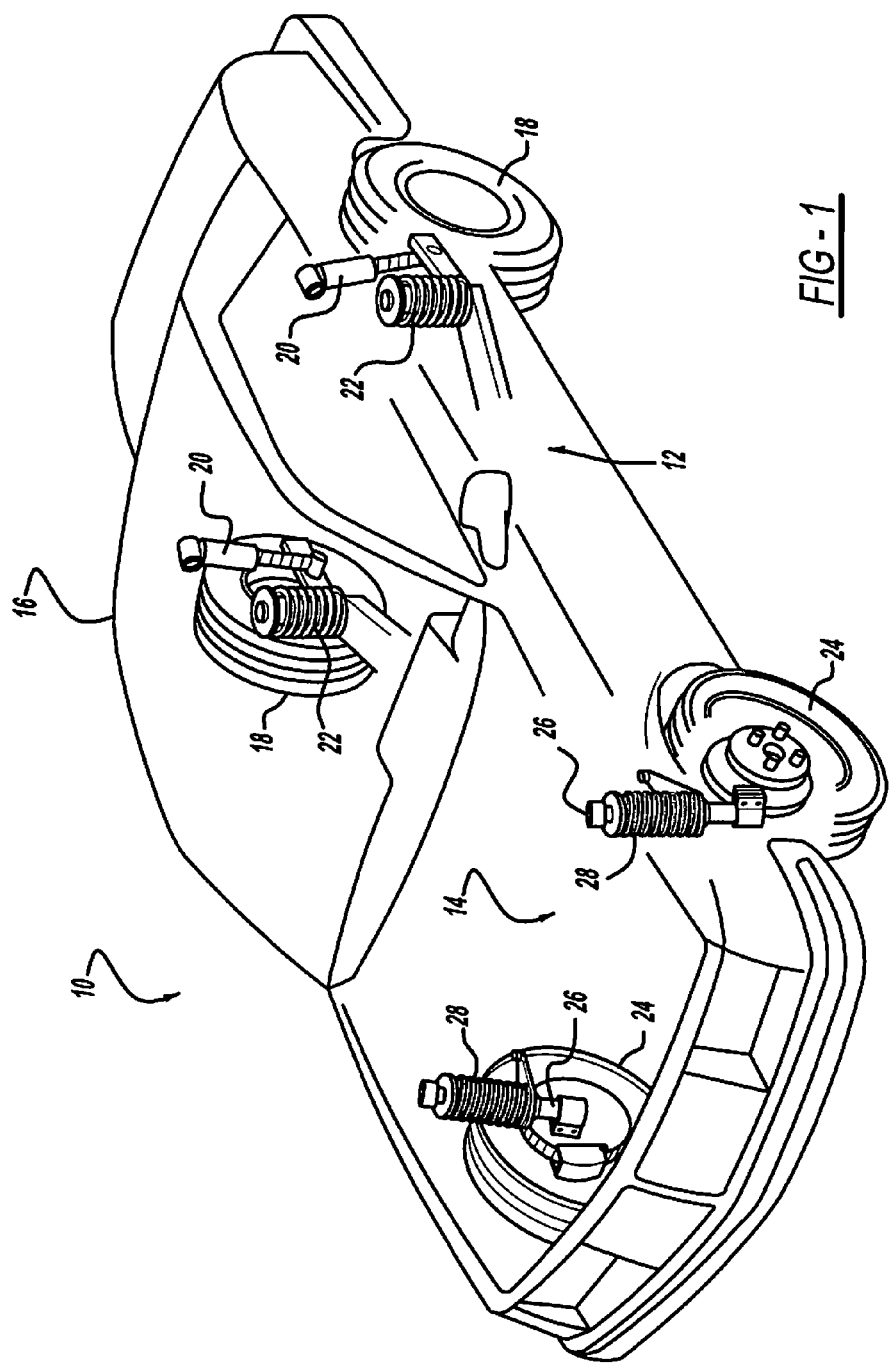
FIG. 1 is a schematic representation of a typical automobile which incorporates the high velocity compression damping valve in accordance with the present disclosure.

Referring now to the drawings in which like reference numerals designate like or corresponding parts throughout the several views; there is shown in FIG. 1 a vehicle incorporating a suspension system incorporating the shock absorbers in accordance with the present invention and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
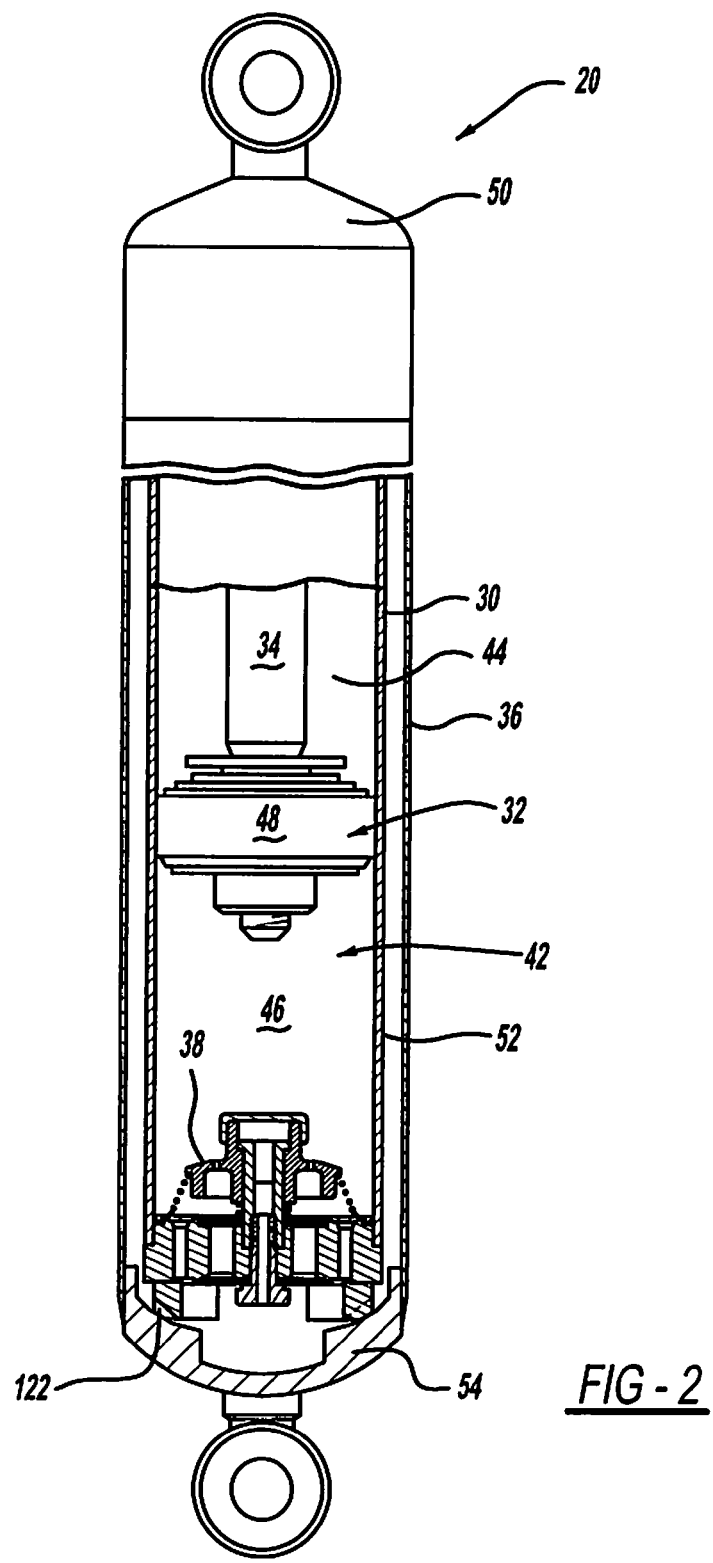
FIG. 2 is a side sectional view of a shock absorber which incorporates the high velocity compression damping in accordance with the present disclosure.

Referring now to FIG. 2, shock absorber 20 is shown in greater detail. While FIG. 2 illustrates only shock absorber 20, it is to be understood that shock absorber 26 also includes the base valve assembly described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through end cap 50 which closes the upper end of pressure tube 30. A sealing system seals the interface between upper end cap 50, reserve tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reserve tube 36 surrounds pressure tube 30 to define a fluid reservoir chamber 52 located between tubes 30 and 36. The bottom end of reserve tube 36 is closed by an end cap 54 which is adapted to be connected to the unsprung portion of vehicle 10. While end cap 54 is illustrated as a separate component, it is within the scope of the present disclosure to have end cap 54 integral with reserve tube 36. The upper end of reserve tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
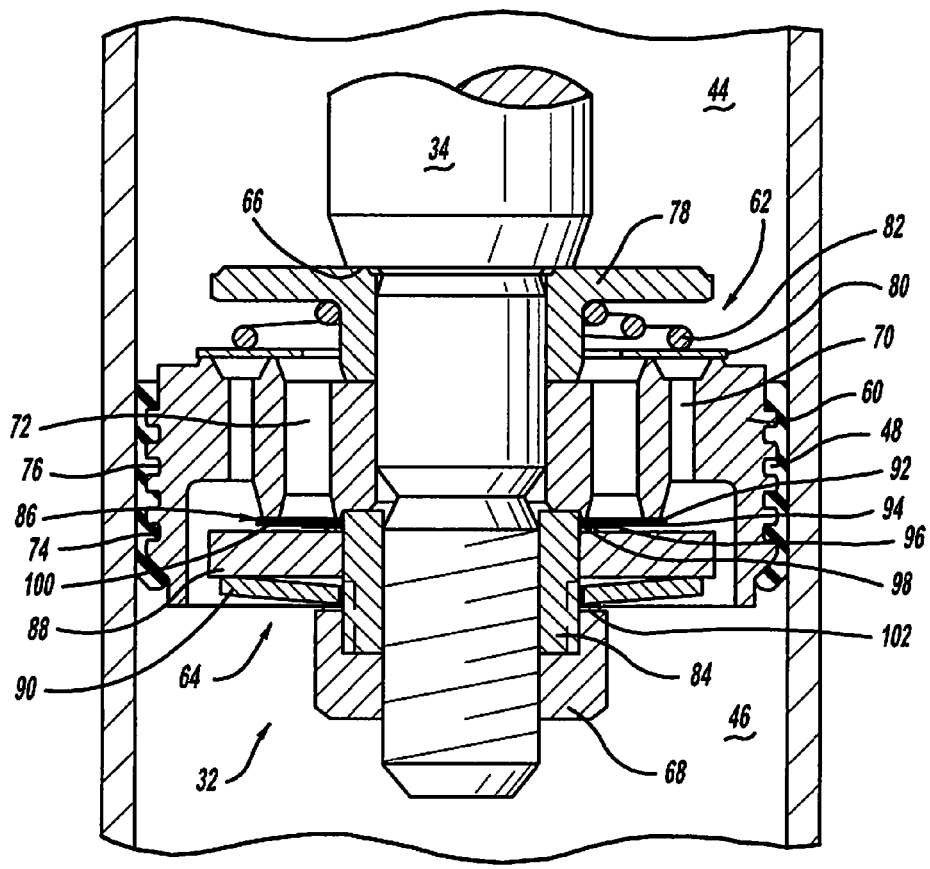
FIG. 3 is an enlarged cross-sectional view of the piston assembly illustrated in FIG. 2.

Referring now to FIG. 3, piston assembly 32 comprises a piston body 60, a compression valve assembly 62 and a rebound valve assembly 64. Compression valve assembly 62 is assembled against a shoulder 66 on piston rod 34. Piston body 60 is assembled against compression valve assembly 62 and rebound valve assembly 64 is assembled against piston body 60. A nut 68 secures these components to piston rod 34.

Piston body 60 defines a plurality of compression passages 70 and a plurality of rebound passages 72. Seal 48 includes a plurality of ribs 74 which mate with a plurality of annular grooves 76 to restrict sliding movement of seal 48 relative to piston body 60 as piston assembly 32 slides in pressure tube 30.

Compression valve assembly 62 comprises a retainer 78, a valve disc 80 and a spring 82. Retainer 78 abuts shoulder 66 on one end and piston body 60 on the other end. Valve disc 80 abuts piston body 60 and closes compression passages 70 while leaving rebound passages 72 open. Spring 82 is disposed between retainer 78 and valve disc 80 to bias valve disc 80 against piston body 60. During a compression stroke, fluid in lower working chamber 46 is pressurized causing fluid pressure to react against valve disc 80. When the fluid pressure against valve disc 80 overcomes the biasing load of spring 82, valve disc 80 separates from piston body 60 to open compression passages 70 and allow fluid flow from lower working chamber to upper working chamber. Typically spring 82 only exerts a light load on valve disc 80 and compression valve assembly 62 acts like a check valve between chambers 46 and 44. The damping characteristics for shock absorber 20 during a compression stroke of shock absorber 20 are controlled by base valve assembly 38 which accommodates the flow of fluid from lower working chamber 46 to reservoir chamber 52 due to the "rod volume" concept as detailed below. During a rebound stroke, compression passages 70 are closed by valve disc 80.

Rebound valve assembly 64 comprises a spacer 84, a plurality of valve discs 86, a retainer 88 and a spring 90. Spacer 84 is threadingly received on piston rod 34 and is disposed between piston body 60 and nut 68. Spacer 84 retains piston body 60 and compression valve assembly 62 while permitting the tightening of nut 68 without compressing either valve disc 80 or valve discs 86. Retainer 78, piston body 60 and spacer 84 provide a continuous solid connection between shoulder 66 and nut 68 to facilitate the tightening and securing of nut 68 to spacer 84 and thus to piston rod 34. Valve discs 86 are slidingly received on spacer 84 and abut piston body 60 to close rebound passages 72 while leaving compression passages 70 open. Retainer 88 is also slidingly received on spacer 84 and it abuts valve discs 86. Spring 90 is assembled over spacer 84 and is disposed between retainer 88 and nut 68 which is threadingly received on spacer 84. Spring 90 biases retainer 88 against valve discs 86 and valve discs 86 against piston body 60. The plurality of valve discs 86 comprise a bleed disc 92, a valve disc 94, a spacer disc 96 and a fulcrum disc 98. Bleed disc 92 includes at least one slot 100 which permits a limited amount of bleed flow bypassing rebound valve assembly 64. Fulcrum disc 98 provides a fulcrum or bending point for bleed disc 92, valve disc 94 and spacer disc 96. When fluid pressure is applied to discs 92 and 94, they will elastically deflect at the outer peripheral edge of spacer disc 96 and fulcrum disc 98 to open rebound valve assembly 64. A shim 102 is located between nut 68 and spring 90 to control the preload for spring 90 and thus the blow off pressure as described below. Thus, the calibration for the blow off feature of rebound valve assembly 64 is separate from the calibration for compression valve assembly 62.

During a rebound stroke, fluid in upper working chamber 44 is pressurized causing fluid pressure to react against valve discs 86. When the fluid pressure reacting against valve discs 86 overcomes the bending load for valve discs 86, valve discs 86 elastically deflect opening rebound passages 72 allowing fluid flow from upper working chamber 44 to lower working chamber 46. The strength of valve discs 86 and the size of rebound passages will determine the damping characteristics for shock absorber 20 in rebound. Prior to the deflection of valve discs 86, a controlled amount of fluid flows from upper working chamber 44 to lower working chamber 46 through slot 100 to provide low speed tunability. When the fluid pressure within upper working chamber 44 reaches a predetermined level, the fluid pressure will overcome the biasing load of spring 90 causing axial movement of retainer 88 and the plurality of valve discs 86. The axial movement of retainer 88 and valve discs 86 fully opens rebound passages 72 thus allowing the passage of a significant amount of damping fluid creating a blowing off of the fluid pressure which is required to prevent damage to shock absorber 20 and/or vehicle 10. Additional fluid required to be added to lower working chamber 46 due to the "rod volume" concept will flow through base valve assembly 38.

Figure 4:
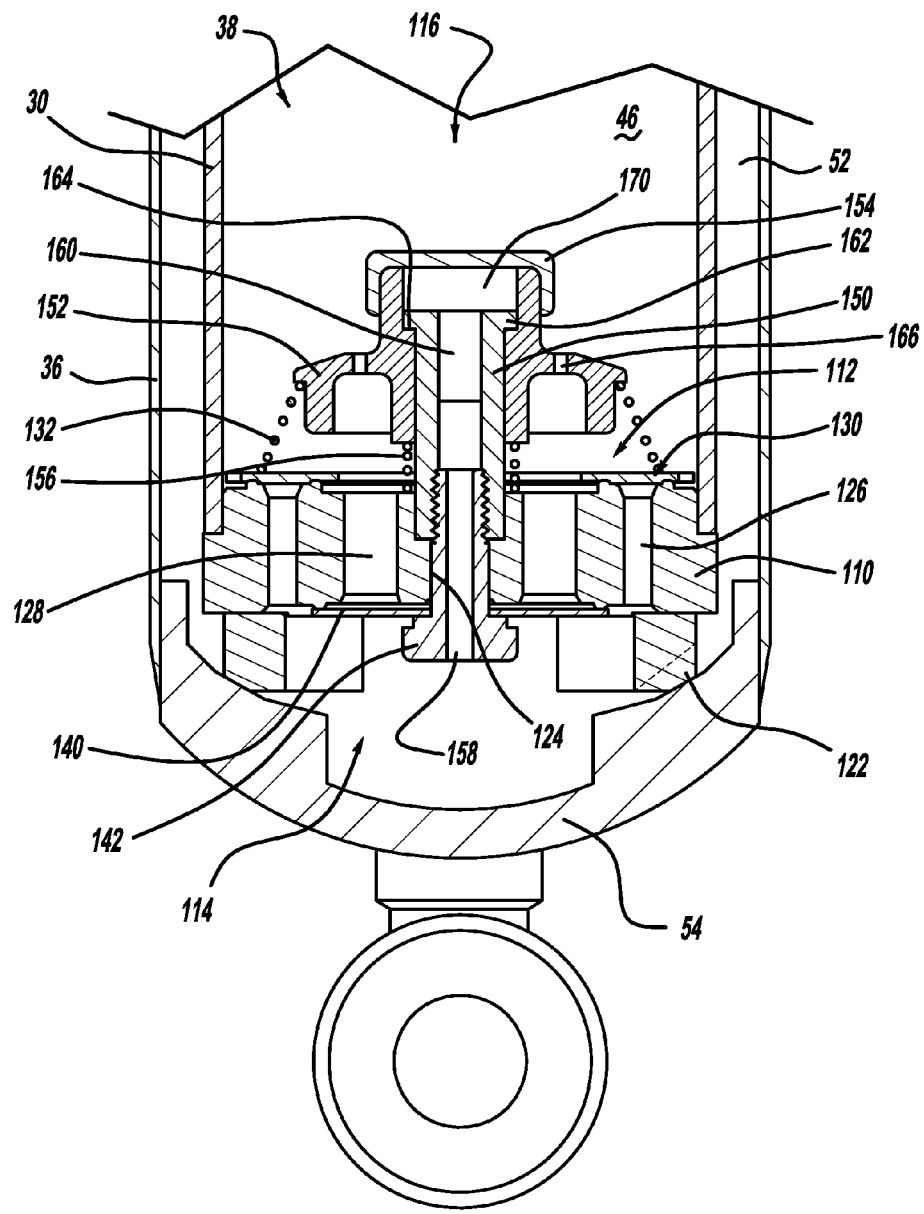
FIG. 4 is an enlarged cross-sectional view of the base valve assembly illustrated in FIG. 2 in an open position.
Figure 5:
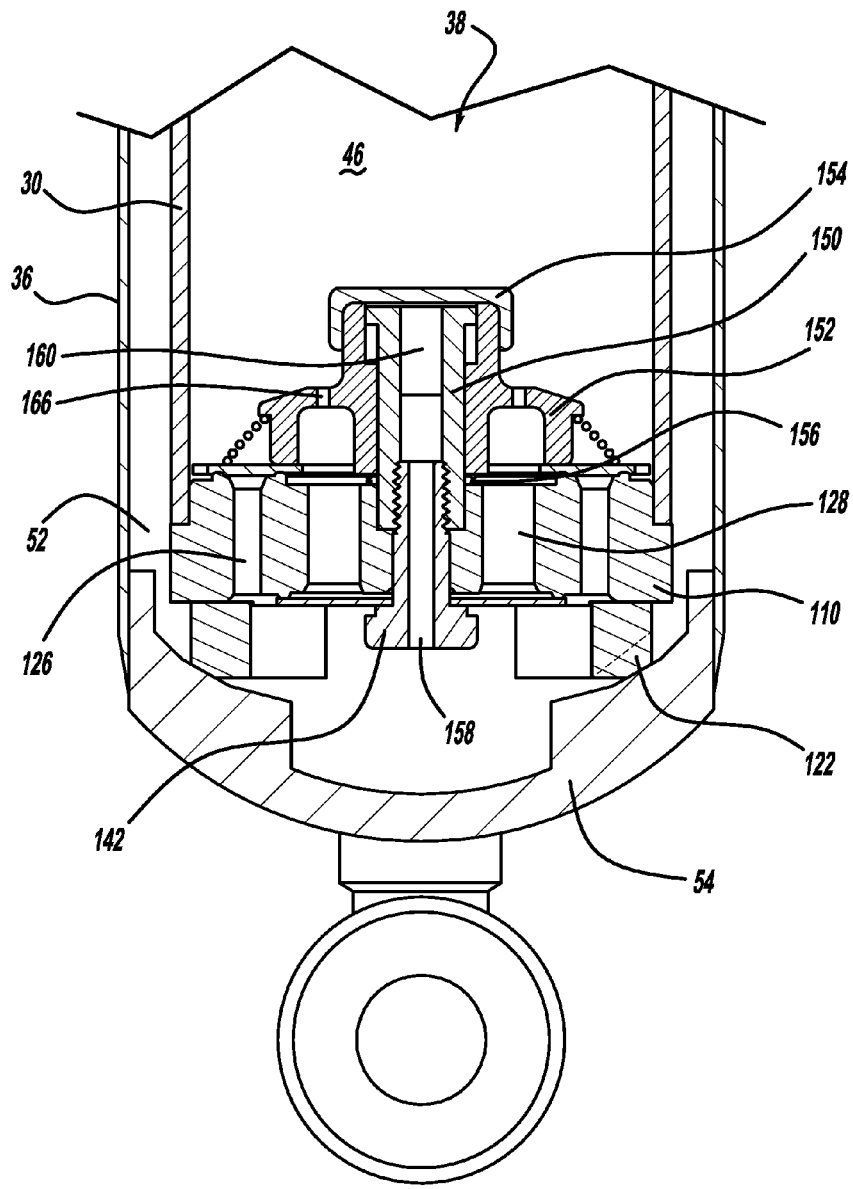
FIG. 5 is an enlarged cross-sectional view of the base valve assembly illustrated in FIG. 4 in a closed position.

Referring now to FIGS. 4 and 5, base valve assembly 38 is illustrated. Base valve assembly 38 comprises a cylinder end 110, a rebound valve assembly 112, a compression valve assembly 114 and a pressure sensitive valve assembly 116. Cylinder end 110 is attached to pressure tube 30 and separates lower working chamber 46 from reservoir chamber 52. Cylinder end 110 engages end cap 54 and it defines a plurality of fluid passages 122 open to reservoir chamber 52. Cylinder end 110 defines a central passage 124 extending between lower working chamber 46 and reservoir chamber 52 through fluid passages 122, a plurality of rebound fluid passages 126 extending between lower working chamber 46 and reservoir chamber 52 through fluid passages 122 and a plurality of compression fluid passages 128 extending between lower working chamber 46 and reservoir chamber 52 through fluid passages 122.

Rebound valve assembly 112 comprises one or more valve discs 130 and a valve spring 132. Valve discs 130 close the plurality of rebound fluid passages 126 and valve spring 132 is disposed between pressure sensitive valve assembly 116 and valve disc 130 to bias valve disc 130 against cylinder end 110. During a rebound stroke of shock absorber 20, the "rod volume" concept requires fluid to flow from reservoir chamber 52 to lower working chamber 46. The rebound stroke reduces the fluid pressure within lower working chamber 46 and the fluid pressure within reservoir chamber 52 will exceed the fluid pressure within lower working chamber 46. The fluid pressure within reservoir chamber 52 will react against valve disc 130 and when the load on valve disc 130 from the fluid pressure exceeds the biasing load of valve spring 132, valve disc 130 will unseat from cylinder end 110 and fluid will flow from reservoir chamber 52 through fluid passages 122, through rebound fluid passages 126 and into lower working chamber 46. Valve spring 132 is designed to exert a minimum load against valve disc 130 such that rebound valve assembly 112 acts like a check valve during a rebound stroke and does not substantially contribute to the damping loads for shock absorber 20. The damping load during a rebound stroke for shock absorber 20 is created by rebound valve assembly 64 of piston assembly 32.

Compression valve assembly 114 comprises one or more valve discs 140 and a bolt 142. Valve discs 140 close the plurality of compression fluid passages 128 and bolt 142 threadingly engages pressure sensitive valve assembly 116 to secure valve disc 140 against cylinder end 110. During a compression stroke of shock absorber 20, the "rod volume" concept requires fluid to flow from lower working chamber 46 to reservoir chamber 52. During the compression stroke, fluid pressure in lower working chamber 46 increases and this fluid pressure reacts against valve discs 140. As the fluid pressure within lower working chamber 46 increases, the fluid pressure reacts against valve discs 140 and eventually valve discs 140 will deflect to open compression fluid passages 128. Fluid will flow from lower working chamber 46, through compression fluid passages 128, through fluid passages 122 and into reservoir chamber 52. The damping load during a compression stroke is created by compression valve assembly 114. As described above, compression valve assembly 62 of piston assembly 32 acts like a check valve and does not substantially contribute to the damping loads for shock absorber 20. Compression valve assembly 114 is a normally closed compression valve assembly which is opened by the pressure differential between lower working chamber 46 and reservoir chamber 52. The flow through compression valve assembly 114 is directly proportional to the pressure differential. The greater the pressure differential, the greater deflection of valve discs 140 and the greater the flow through compression valve assembly 114.

Pressure sensitive valve assembly 116 is a pressure actuated valve assembly which comprises cylinder end 110, a stem 150, a spool 152, a spool cap 154 and a valve spring 156. Stem 150 is disposed within central passage 124 and is secured to cylinder end 110 by bolt 142 of compression valve assembly 114. Bolt 142 defines a central fluid passage 158 and stem 150 defines a central fluid passage 160 to provide for a pressure drop as described below.

Spool 152 is slidingly received over stem 150. Upward movement of spool 152 on stem 150 is limited by a flange 162 on stem 150 which engages a shoulder 164 defined by spool 152. Valve spring 132 of rebound valve assembly 112 and valve spring 156 of pressure sensitive valve assembly 116 biases shoulder 164 of spool 152 against flange 162 of stem 150 to allow fluid to flow from lower working chamber 46 into the plurality of compression fluid passages 128. Spool cap 154 is secured to spool 152. Spool 152 defines one or more holes 166.

During a compression stroke, fluid pressure within lower working chamber 46 acts against spool 152 and spool cap 154 of pressure sensitive valve assembly 116. The fluid pressure within reservoir chamber 52 acts against spool 152 and spool cap 154 of pressure sensitive valve assembly 116. The reservoir fluid pressure is channeled to spool 152 and spool cap 154 through fluid passages 122, 158 and 160. The biasing of valve spring 132 and valve spring 156 allows for the normal flow of fluid through compression valve assembly 114 as described above as long as the pressure difference across spool 152 does not generate sufficient load to overcome the biasing load of valve spring 132 and valve spring 156. Once the pressure differential acting on spool 152 exceeds the biasing load of valve spring 132 and valve spring 156, spool 152 will slide downward on stem 150 and close or prohibit fluid flow from lower working chamber 46 to the plurality of compression fluid passages 128 as illustrated in FIG. 5. Once the fluid pressure across spool 152 reduces, valve spring 132 and valve spring 156 will again bias spool 152 upward against flange 162. When spool 152 closes or prohibits fluid flow, the fluid pressure in lower working chamber 46 exponentially increases and the only flow between lower working chamber 46 and reservoir chamber 52 is through the one or more holes 166 and compression valve assembly 114. The area of the one or more holes 166 and the instantaneous velocity of piston assembly 32 will define the final damping forces achieved. The increase in fluid pressure within lower working chamber 46 is a function of the velocity of piston assembly 32 and thus pressure sensitive valve assembly 116 is a pressure sensitive valve which opens and closes based upon the velocity of piston assembly 32. Pressure sensitive valve assembly 116 is a normally open compression valve assembly which is closed by the pressure differential between lower working chamber 46 and reservoir chamber 52 where the pressure differential is determined by the velocity of piston assembly 32.

The movement of spool 152 can be controlled or damped by controlling the diameter of central fluid passage 158 of bolt 142. As illustrated in FIG. 4, a fluid chamber 170 is located above bolt 142. This volume must be displaced through central fluid passage 158 in order for spool 152 to move downward. By controlling the diameter of central fluid passage 158 the period of time that it takes spool 152 to move downward can be controlled. Thus, a damping effect can be achieved in regard to this motion of spool 152.

Pressure sensitive valve assembly 116 can also be converted to an acceleration sensitive valve assembly. By eliminating central fluid passage 158 and eliminating spool cap 154, pressure sensitive valve assembly 116 would be converted from a pressure sensitive valve assembly to an acceleration sensitive valve assembly. In this configuration, motion of spool 152 would be defined by the mass of spool 152 and the design for valve spring 156. These specifications can be tuned to a specific desired frequency and will provide a similar increase in damping force once closed. Final damping force will be defined by providing bypass passage 166 as previously discussed.

Figure 6:
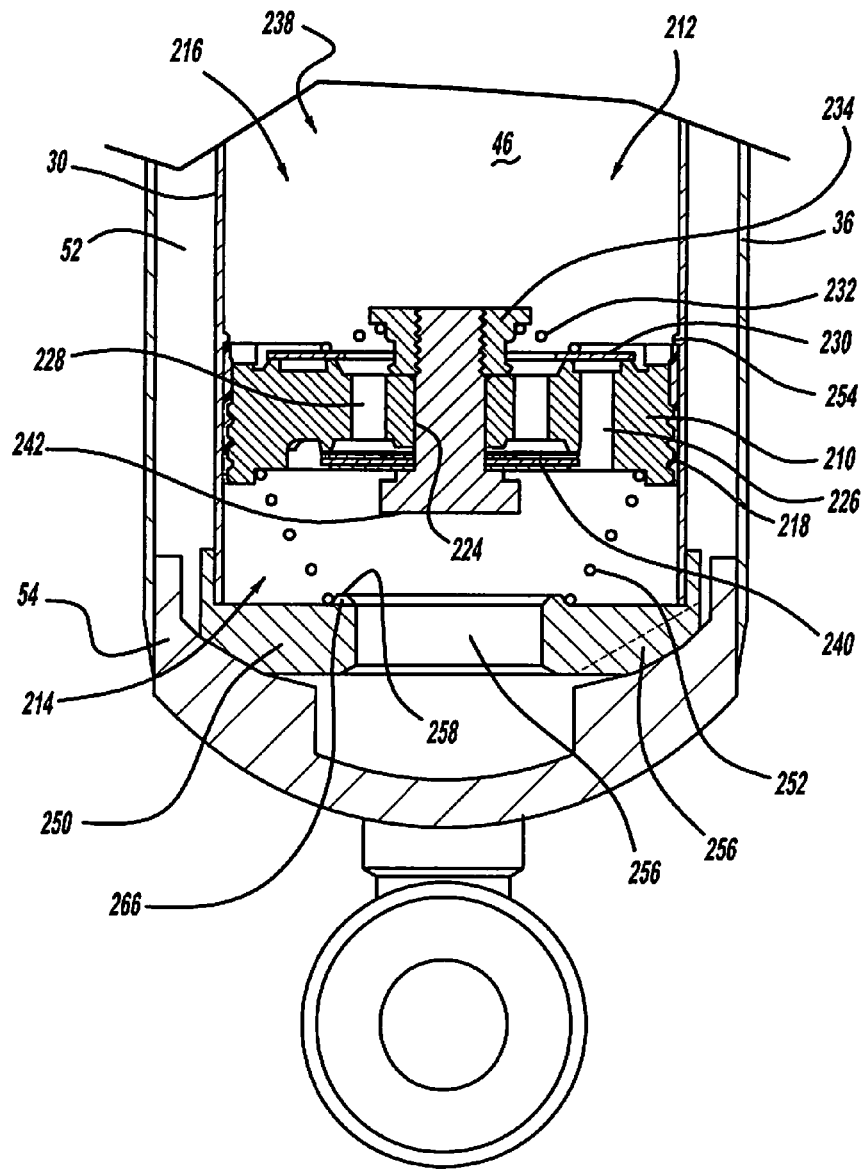
FIG. 6 is an enlarged cross-sectional view of a base valve assembly in accordance with another embodiment of the present disclosure in an open position.

Referring now to FIG. 6, base valve assembly 238 is illustrated. Base valve assembly 238 comprises a piston 210 having a seal 218, a rebound valve assembly 212, a compression valve assembly 214 and a pressure sensitive valve assembly 216. Piston 210 is slidingly received in pressure tube 30 and separates lower working chamber 46 from reservoir chamber 52. Piston 210 defines a central passage 224 extending between lower working chamber 46 and reservoir chamber 52, a plurality of rebound fluid passages 226 extending between lower working chamber 46 and reservoir chamber 52 and a plurality of compression fluid passages 228 extending between lower working chamber 46 and reservoir chamber 52.

Rebound valve assembly 212 comprises one or more valve discs 230 and a valve spring 232 and a nut 234. Valve disc or valve discs 230 closes the plurality of rebound fluid passages 226 and valve spring 232 is disposed between nut 234 and valve disc 230 to bias valve disc 230 against piston 210. Fluid access to compression fluid passages 228 is provided by a plurality of apertures which extend through valve disc 230. During a rebound stroke of shock absorber 20, the "rod volume" concept requires fluid to flow from reservoir chamber 52 to lower working chamber 46. The rebound stroke reduces the fluid pressure within lower working chamber 46 and the fluid pressure within reservoir chamber 52 will exceed the fluid pressure within lower working chamber 46. The fluid pressure within reservoir chamber 52 will react against valve disc 230 and when the load on valve disc 230 from the fluid pressure exceeds the biasing load of valve spring 232, valve disc 230 will unseat from piston 210 and fluid will flow from reservoir chamber 52, through rebound fluid passages 226 and into lower working chamber 46. Valve spring 232 is designed to exert a minimum load against valve disc 230 such that rebound valve assembly 212 acts like a check valve during a rebound stroke and does not substantially contribute to the damping loads for shock absorber 20. The damping load during a rebound stroke for shock absorber 20 is created by rebound valve assembly 64 of piston assembly 32.

Compression valve assembly 214 comprises one or more valve discs 240 and a bolt 242. Valve discs 240 close the plurality of compression fluid passages 228 and bolt 242 threadingly engages nut 234 to secure valve disc 240 against piston 210. During a compression stroke of shock absorber 20, the "rod volume" concept requires fluid to flow from lower working chamber 46 to reservoir chamber 52. During the compression stroke, fluid pressure in lower working chamber 46 increases and this fluid pressure reacts against valve discs 240. As the fluid pressure within lower working chamber 46 increases, the fluid pressure reacts against valve discs 240 and eventually valve discs 240 will deflect to open compression fluid passages 228. Fluid will flow from lower working chamber 46, through fluid passages 228 and into reservoir chamber 52. The damping load during a compression stroke is created by compression valve assembly 214. As described above, compression valve assembly 62 of piston assembly 32 acts like a check valve and does not substantially contribute to the damping loads for shock absorber 20. Compression valve assembly 214 is a normally closed compression valve assembly which is opened by the pressure differential between lower working chamber 46 and reservoir chamber 52. The flow through compression valve assembly 214 is directly proportional to the pressure differential. The greater the pressure differential, the greater deflection of valve discs 140 and the greater the flow through compression valve assembly 214.

Pressure sensitive valve assembly 216 comprises piston 210, a cylinder end 250 and a biasing spring 252. Cylinder end 250 is attached to pressure tube 30 and it engages end cap 54. Piston 210 is slidably disposed within pressure tube 30 and slides between cylinder end 250 and a stop 254. Biasing spring 252 urges piston 210 towards stop 254. Cylinder end 250 defines one or more apertures 256 which allow fluid flow between lower working chamber 46 and reservoir chamber 52.

During a compression stroke, fluid pressure within lower working chamber 46 acts against the upper side of piston 210. The fluid pressure within reservoir chamber 52 acts against the lower side of piston 210. The biasing load of biasing spring 252 allows for the normal flow of fluid through compression valve assembly 214 as described above as long as the pressure differential across piston 210 does not generate sufficient load to overcome the biasing load of biasing spring 252. Once the pressure differential across piston 210 generates sufficient load to overcome the biasing load of biasing spring 252, piston 210 will slide downward in pressure tube 30. As piston 210 approaches cylinder end 250, compression valve assembly 214 will contact a land 258 on cylinder end 250 and close or prohibit fluid flow from lower working chamber 46 through apertures 256 to reservoir chamber 52. When the fluid pressure difference across piston 210 reduces, biasing spring 252 will again bias piston 210 against stop 254. As illustrated, valve discs 240 contact land 258 but the present invention is not limited to this concept as other components could prohibit fluid flow. Pressure sensitive valve assembly 216 is a normally open compression valve assembly which is closed by the pressure differential between lower working chamber 46 and reservoir chamber 52 where the pressure differential is determined by the velocity of piston assembly 32.

The fluid pressure in lower working chamber 46 exponentially increases and, when the pressure sensitive valve assembly 216 is forced into its fully closed position, the only flow between lower working chamber 46 and reservoir chamber 52 is through a bypass 266 defined by compression valve assembly 214 or by compression valve assembly 214 and pressure sensitive valve assembly 216. Bypass 266 can include a passage around or through valve discs 240 or a bypass passage defined by piston 210 and cylinder end 250. The area of bypass 266 and the instantaneous velocity of piston assembly 32 will define the final damping forces achieved. The increase in fluid pressure within lower working chamber 46 is function of the velocity of piston assembly 32 and thus, pressure sensitive valve assembly 216 is a pressure sensitive valve which opens and closes based upon the velocity of piston assembly 32.

Figure 7:
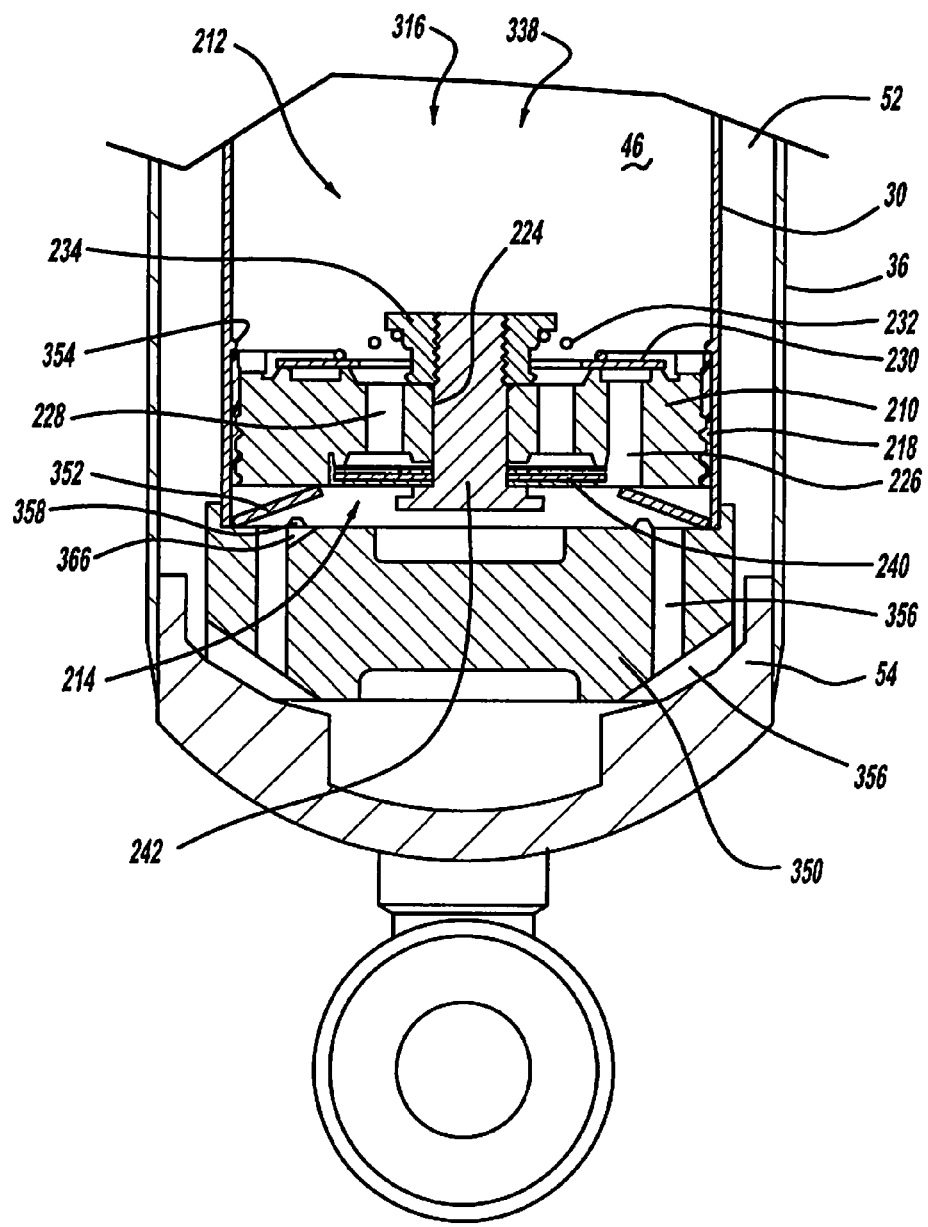
FIG. 7 is an enlarged cross-sectional view of a base valve assembly in accordance with another embodiment of the present disclosure in an open position.

Referring now to FIG. 7, base valve assembly 338 is illustrated. Base valve assembly 338 comprises piston 210, rebound valve assembly 212, compression valve assembly 214 and a pressure sensitive valve assembly 316. Piston 210 is slidingly received in pressure tube 30 and separates lower working chamber 46 from reservoir chamber 52. Piston 210 defines central passage 224 extending between lower working chamber 46 and reservoir chamber 52, the plurality of rebound fluid passages 226 extending between lower working chamber 46 and reservoir chamber 52 and the plurality of compression fluid passages 228 extending between lower working chamber 46 and reservoir chamber 52.

Rebound valve assembly 212 comprises the one or more valve discs 230, valve spring 232 and nut 234. Valve disc or valve discs 230 close the plurality of rebound fluid passages 226 and valve spring 232 is disposed between nut 234 and valve disc 230 to bias valve disc 230 against piston 210. Fluid access to compression fluid passages 228 is provided by a plurality of apertures which extend through valve disc 230. During a rebound stroke of shock absorber 20, the "rod volume" concept requires fluid to flow from reservoir chamber 52 to lower working chamber 46. The rebound stroke reduces the fluid pressure within lower working chamber 46 and the fluid pressure within reservoir chamber 52 will exceed the fluid pressure within lower working chamber 46. The fluid pressure within reservoir chamber 52 will react against valve disc 230 and when the load on valve disc 230 from the fluid pressure exceeds the biasing load of valve spring 232, valve disc 230 will unseat from piston 210 and fluid will flow from reservoir chamber 52, through rebound fluid passages 226 and into lower working chamber 46. Valve spring 232 is designed to exert a minimum load against valve disc 230 such that rebound valve assembly 212 acts like a check valve during a rebound stroke and does not substantially contribute to the damping loads for shock absorber 20. The damping load during a rebound stroke for shock absorber 20 is created by rebound valve assembly 64 of piston assembly 32.

Compression valve assembly 214 comprises the one or more valve discs 240 and bolt 242. Valve discs 240 close the plurality of compression fluid passages 228 and bolt 242 threadingly engages nut 234 to secure valve disc 240 against piston 210. During a compression stroke of shock absorber 20, the "rod volume" concept requires fluid to flow from lower working chamber 46 to reservoir chamber 52. During the compression stroke, fluid pressure in lower working chamber 46 increases and this fluid pressure reacts against valve discs 240. As the fluid pressure within lower working chamber 46 increases, the fluid pressure reacts against valve discs 240 and eventually valve discs 240 will deflect to open compression fluid passages 228. Fluid will flow from lower working chamber 46, through fluid passages 228 and into reservoir chamber 52. The damping load during a compression stroke is created by compression valve assembly 214. As described above, compression valve assembly 62 of piston assembly 32 acts like a check valve and does not substantially contribute to the damping loads for shock absorber 20. Compression valve assembly 214 is a normally closed compression valve assembly which is opened by the pressure differential between lower working chamber 46 and reservoir chamber 52. The flow through compression valve assembly 214 is directly proportional to the pressure differential. The greater the pressure differential, the greater deflection of valve discs 140 and the greater the flow through compression valve assembly 214.

Pressure sensitive valve assembly 316 comprises a cylinder end 350 and a biasing spring 352. Cylinder end 350 is attached to pressure tube 30 and it engages end cap 54. Piston 210 is slidably disposed within pressure tube 30 and slides between cylinder end 350 and a stop 354. Biasing spring 352 urges piston 210 towards a stop 354. Cylinder end 350 defines one or more apertures 356 which allow fluid flow between lower working chamber 46 and reservoir chamber 52.

During a compression stroke, fluid pressure within lower working chamber 46 acts against the upper side of piston 210. The fluid pressure within reservoir chamber 52 acts against the lower side of piston 210. The biasing load of biasing spring 352 allows for the normal flow of fluid through compression valve assembly 214 as described above as long as the pressure differential across piston 210 does not generate sufficient load to overcome the biasing load of biasing spring 352. Once the pressure differential across piston 210 generates sufficient load to overcome the biasing load of biasing spring 352, piston 210 will slide down in pressure tube 30. As piston 210 approaches cylinder end 350, biasing spring 352 will interface with a sealing land 358 on cylinder end 350 to close or prohibit fluid flow from lower working chamber 46 to reservoir chamber 52 through apertures 356. When the fluid pressure difference across piston 210 reduces, biasing spring 352 will again bias piston 210 against stop 354. As illustrated, biasing spring 352 interfaces with cylinder end 350 but the present disclosure is not limited to this concept as other components could prohibit the fluid flow. Pressure sensitive valve assembly 316 is a normally open compression valve assembly which is closed by the pressure differential between lower working chamber 46 and reservoir chamber 52 where the pressure differential is determined by the velocity of piston assembly 32.

The fluid pressure in lower working chamber 46 exponentially increases and the only flow between lower working chamber 46 and reservoir chamber 52 is through a bypass 366 defined by compression valve assembly 214 or by compression valve assembly 214 and pressure sensitive valve assembly 316. Bypass 366 can include a passage around or through cylinder end 350. The area of bypass 366 and the instantaneous velocity of piston assembly 32 will define the final damping forces achieved. The increase in fluid pressure within lower working chamber 46 is a function of the velocity of piston assembly 32 and thus pressure sensitive valve assembly 316 is a pressure sensitive valve which opens and closes based upon the velocity of piston assembly 32.

Figure 8:
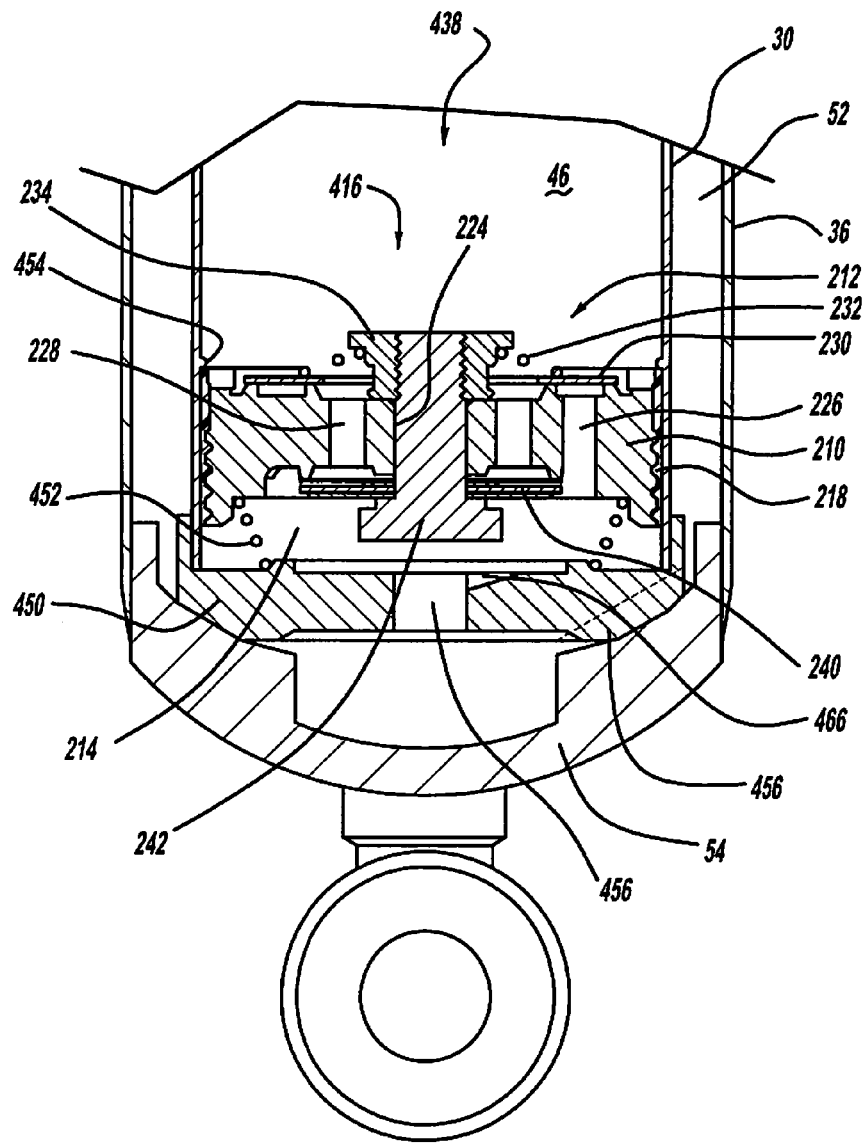
FIG. 8 is an enlarged cross-sectional view of a base valve assembly in accordance with another embodiment of the present disclosure in an open position.

Referring now to FIG. 8, base valve assembly 438 is illustrated. Base valve assembly 438 comprises piston 210, rebound valve assembly 212, compression valve assembly 214 and a pressure sensitive valve assembly 416. Piston 210 is slidingly received in pressure tube 30 and separates lower working chamber 46 from reservoir chamber 52. Piston 210 defines central passage 224 extending between lower working chamber 46 and reservoir chamber 52, the plurality of rebound fluid passages 226 extending between lower working chamber 46 and reservoir chamber 52 and the plurality of compression fluid passages 228 extending between lower working chamber 46 and reservoir chamber 52.

Rebound valve assembly 212 comprises the one or more valve discs 230 valve spring 232 and nut 234. Valve discs 230 close the plurality of rebound fluid passages 226 and valve spring 232 is disposed between nut 234 and valve disc 230 to bias valve disc 230 against piston 210. Fluid access to compression fluid passages 228 is provided by a plurality of apertures which extend through valve disc 230. During a rebound stroke of shock absorber 20, the "rod volume" concept requires fluid to flow from reservoir chamber 52 to lower working chamber 46. The rebound stroke reduces the fluid pressure within lower working chamber 46 and the fluid pressure within reservoir chamber 52 will exceed the fluid pressure within lower working chamber 46. The fluid pressure within reservoir chamber 52 will react against valve disc 230 and when the load on valve disc 230 from the fluid pressure exceeds the biasing load of valve spring 232, valve disc 230 will unseat from piston 210 and fluid will flow from reservoir chamber 52, through rebound fluid passages 226 and into lower working chamber 46. Valve spring 232 is designed to exert a minimum load against valve disc 230 such that rebound valve assembly 212 acts like a check valve during a rebound stroke and does not substantially contribute to the damping loads for shock absorber 20. The damping load during a rebound stroke for shock absorber 20 is created by rebound valve assembly 64 of piston assembly 32.

Compression valve assembly 214 comprises the one or more valve discs 240 and bolt 242. Valve discs 240 close the plurality of compression fluid passages 228 and bolt 242 threadingly engages nut 234 to secure valve disc 240 against piston 210. During a compression stroke of shock absorber 20, the "rod volume" concept requires fluid to flow from lower working chamber 46 to reservoir chamber 52. During the compression stroke, fluid pressure in lower working chamber 46 increases and this fluid pressure reacts against valve discs 240. As the fluid pressure within lower working chamber 46 increases, the fluid pressure reacts against valve discs 240 and eventually valve discs 240 will deflect to open compression fluid passages 228. Fluid will flow from lower working chamber 46, through fluid passages 228 and into reservoir chamber 52. The damping load during a compression stroke is created by compression valve assembly 214. As described above, compression valve assembly 62 of piston assembly 32 acts like a check valve and does not substantially contribute to the damping loads for shock absorber 20. Compression valve assembly 214 is a normally closed compression valve assembly which is opened by the pressure differential between lower working chamber 46 and reservoir chamber 52. The flow through compression valve assembly 214 is directly proportional to the pressure differential. The greater the pressure differential, the greater deflection of valve discs 240 and the greater the flow through compression valve assembly 214.

Pressure sensitive valve assembly 416 comprises piston 210, a cylinder end 450 and a biasing spring 452. Cylinder end 450 is attached to pressure tube 30 and it engages end cap 54. Piston 210 is slidably disposed within pressure tube 30 and slides between cylinder end 450 and a stop 454. Biasing spring 452 urges piston 210 towards stop 454. Cylinder end 450 defines one or more apertures 456 which allow fluid flow between lower working chamber 46 and reservoir chamber 52.

During a compression stroke, fluid pressure within lower working chamber 46 acts against the upper side of piston 210. The fluid pressure within reservoir chamber 52 acts against the lower side of piston 210. The biasing load of biasing spring 452 allows for the normal flow of fluid through compression valve assembly 214 as described above as long as the pressure differential across piston 210 does not generate sufficient load to overcome the biasing load of biasing spring 452. Once the pressure differential across piston 210 generates sufficient load to overcome the biasing load of biasing spring 452, piston 210 will slide downward in pressure tube 30. As piston 210 approaches cylinder end 450, bolt 242 will contact cylinder end 450 and close or prohibit fluid flow from lower working chamber 46 through apertures 456 to reservoir chamber 52. When the fluid pressure difference across piston 210 reduces, biasing spring 452 will again bias piston 210 against stop 454. As illustrated, bolt 242 contacts cylinder end 450 but the present invention is not limited to this concept as other components could prohibit fluid flow. Pressure sensitive valve assembly 416 is a normally open compression valve assembly which is closed by the pressure differential between lower working chamber 46 and reservoir chamber 52 where the pressure differential is determined by the velocity of piston assembly 32.

The fluid pressure in lower working chamber 46 exponentially increases and the only flow between lower working chamber 46 and reservoir chamber 52 is through a bypass 466 defined by compression valve assembly 214 or by compression valve assembly 214 and pressure sensitive valve assembly 216. Bypass 466 can include a passage around or through cylinder end 450. The area of bypass 466 and the instantaneous velocity of piston assembly 32 will define the final damping forces achieved. The increase in fluid pressure within lower working chamber 46 is function of the velocity of piston assembly 32 and thus, pressure sensitive valve assembly 416 is a pressure sensitive valve which opens and closes based upon the velocity of piston assembly 32.

Figure 9:
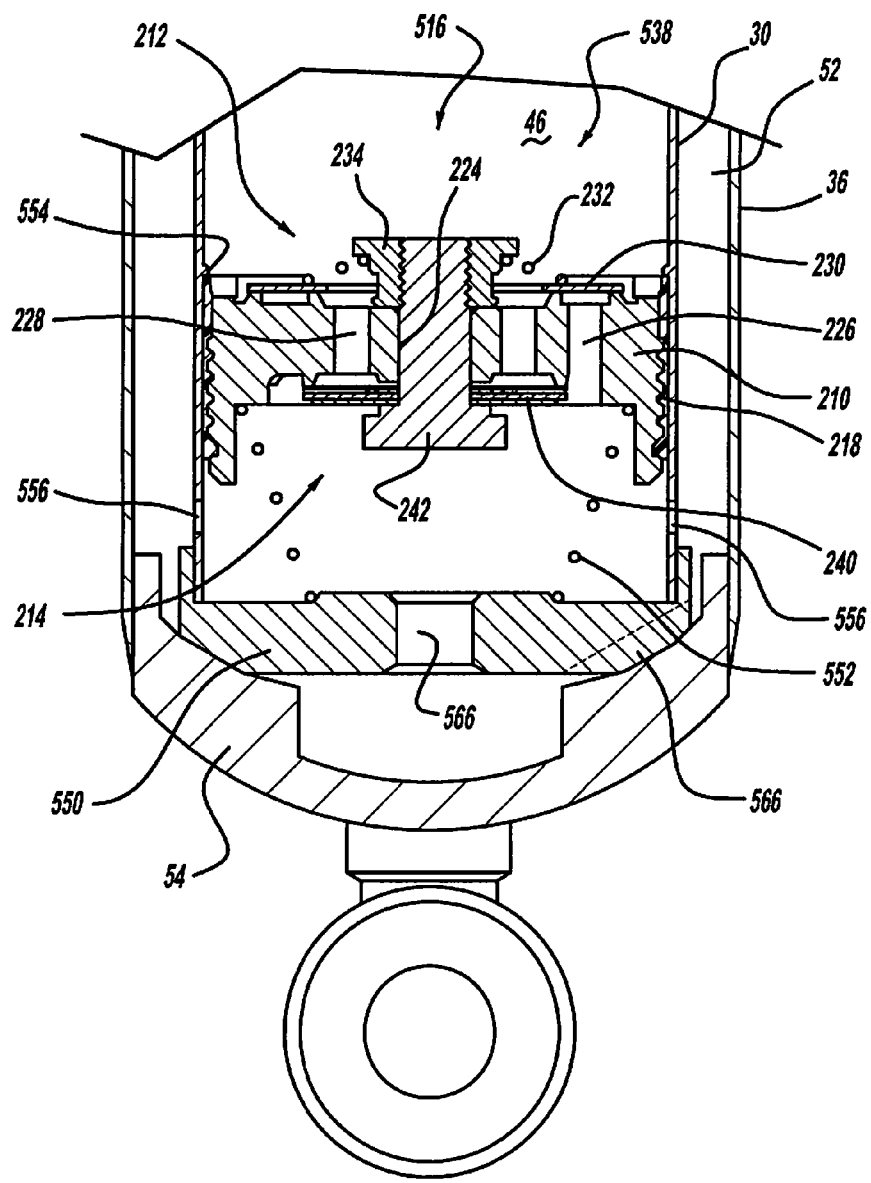
FIG. 9 is an enlarged cross-sectional view of a base valve assembly in accordance with another embodiment of the present disclosure in an open position.

Referring now to FIG. 9, base valve assembly 538 is illustrated. Base valve assembly 538 comprises piston 210, rebound valve assembly 212, compression valve assembly 214 and a pressure sensitive valve assembly 516. Piston 210 is attached to pressure tube 30 and separates lower working chamber 46 from reservoir chamber 52. Piston 210 defines central passage 224 extending between lower working chamber 46 and reservoir chamber 52, the plurality of rebound fluid passages 226 extending between lower working chamber 46 and reservoir chamber 52 and the plurality of compression fluid passages 228 extending between lower working chamber 46 and reservoir chamber 52.

Rebound valve assembly 212 comprises the one or more valve discs 230, valve spring 232 and nut 234. Valve discs 230 close the plurality of rebound fluid passages 226 and valve spring 232 is disposed between nut 234 and valve disc 230 to bias valve disc 230 against piston 210. Fluid access to compression fluid passages 228 is provided by a plurality of apertures which extend through valve disc 230. During a rebound stroke of shock absorber 20, the "rod volume" concept requires fluid to flow from reservoir chamber 52 to lower working chamber 46. The rebound stroke reduces the fluid pressure within lower working chamber 46 and the fluid pressure within reservoir chamber 52 will exceed the fluid pressure within lower working chamber 46. The fluid pressure within reservoir chamber 52 will react against valve disc 230 and when the load on valve disc 230 from the fluid pressure exceeds the biasing load of valve spring 232, valve disc 230 will unseat from piston 210 and fluid will flow from reservoir chamber 52, through rebound fluid passages 226 and into lower working chamber 46. Valve spring 232 is designed to exert a minimum load against valve disc 230 such that rebound valve assembly 212 acts like a check valve during a rebound stroke and does not substantially contribute to the damping loads for shock absorber 20. The damping load during a rebound stroke for shock absorber 20 is created by rebound valve assembly 64 of piston assembly 32.

Compression valve assembly 214 comprises the one or more valve discs 240 and bolt 242. Valve discs 240 close the plurality of compression fluid passages 228 and bolt 242 threadingly engages nut 234 to secure valve disc 240 against cylinder end 250. During a compression stroke of shock absorber 20, the "rod volume" concept requires fluid to flow from lower working chamber 46 to reservoir chamber 52. During the compression stroke, fluid pressure in lower working chamber 46 increases and this fluid pressure reacts against valve discs 240. As the fluid pressure within lower working chamber 46 increases, the fluid pressure reacts against valve discs 240 and eventually valve discs 240 will deflect to open compression fluid passages 228. Fluid will flow from lower working chamber 46, through fluid passages 228 and into reservoir chamber 52. The damping load during a compression stroke is created by compression valve assembly 214. As described above, compression valve assembly 62 of piston assembly 32 acts like a check valve and does not substantially contribute to the damping loads for shock absorber 20. Compression valve assembly 214 is a normally closed compression valve assembly which is opened by the pressure differential between lower working chamber 46 and reservoir chamber 52. The flow through compression valve assembly 214 is directly proportional to the pressure differential. The greater the pressure differential, the greater deflection of valve discs 140 and the greater the flow through compression valve assembly 214.

Pressure sensitive valve assembly 516 comprises piston 210, a cylinder end 550 and a biasing spring 552. Cylinder end 550 is attached to pressure tube 30 and it engages end cap 54. Piston 210 is slidably disposed within pressure tube 30 and slides between cylinder end 550 and a stop 554. Biasing spring 552 urges piston 210 towards stop 554. Pressure tube 30 defines one or more apertures 556 which allow fluid flow between lower working chamber 46 and reservoir chamber 52.

During a compression stroke, fluid pressure within lower working chamber 46 acts against the upper side of piston 210. The fluid pressure within reservoir chamber 52 acts against the lower side of piston 210. The biasing load of biasing spring 552 allows for the normal flow of fluid through compression valve assembly 214 as described above as long as the pressure differential across piston 210 does not generate sufficient load to overcome the biasing load of biasing spring 552. Once the pressure differential across piston 210 generates sufficient load to overcome the biasing load of biasing spring 552, piston 210 will slide downward in pressure tube 30. As piston 210 approaches cylinder end 550, bolt 242 will begin to cover apertures 556 and close or prohibit fluid flow from lower working chamber 46 through apertures 556 to reservoir chamber 52. When the fluid pressure difference across piston 210 reduces, biasing spring 552 will again bias piston 210 against stop 554. Pressure sensitive valve assembly 516 is a normally open compression valve assembly which is closed by the pressure differential between lower working chamber 46 and reservoir chamber 52 where the pressure differential is determined by the velocity of piston assembly 32.

The fluid pressure in lower working chamber 46 exponentially increases and the only flow between lower working chamber 46 and reservoir chamber 52 is through a bypass 566 defined by compression valve assembly 214 or by compression valve assembly 214 and pressure sensitive valve assembly 216. Bypass 566 can include a bypass passage defined by piston 210 and pressure tube 30. The area of bypass 566 and the instantaneous velocity of piston assembly 32 will define the final damping forces achieved. The increase in fluid pressure within lower working chamber 46 is function of the velocity of piston assembly 32 and thus, pressure sensitive valve assembly 516 is a pressure sensitive valve which opens and closes based upon the velocity of piston assembly 32.

Figure 10:
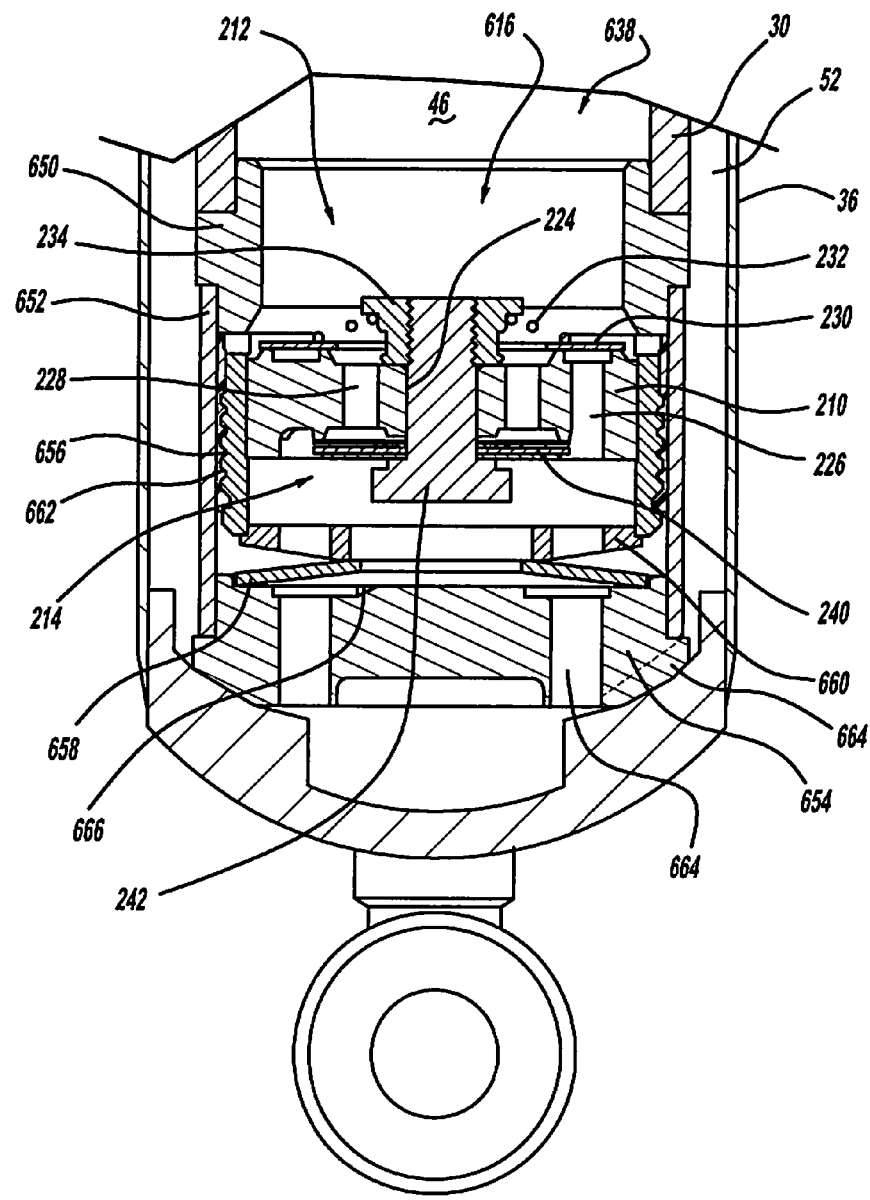
FIG. 10 is an enlarged cross-sectional view of a base valve assembly in accordance with another embodiment of the present disclosure in an open position.

Referring now to FIG. 10, base valve assembly 638 is illustrated. Base valve assembly 638 comprises piston 210, rebound valve assembly 212, compression valve assembly 214 and pressure sensitive valve assembly 616. Piston 210 is attached to pressure tube 30 and separates lower working chamber 46 from reservoir chamber 52. Piston 210 defines a central passage 224 extending between lower working chamber 46 and reservoir chamber 52, the plurality of rebound fluid passages 226 extending between lower working chamber 46 and reservoir chamber 52 and the plurality of compression fluid passages 228 extending between lower working chamber 46 and reservoir chamber 52.

Rebound valve assembly 212 comprises the one or more valve discs 230, valve spring 232 and nut 234. Valve discs 230 close the plurality of rebound fluid passages 226 and valve spring 232 is disposed between nut 234 and valve disc 230 to bias valve disc 230 against piston 210. Fluid access to compression fluid passages 228 is provided by a plurality of apertures which extend through valve disc 230. During a rebound stroke of shock absorber 20, the "rod volume" concept requires fluid to flow from reservoir chamber 52 to lower working chamber 46. The rebound stroke reduces the fluid pressure within lower working chamber 46 and the fluid pressure within reservoir chamber 52 will exceed the fluid pressure within lower working chamber 46. The fluid pressure within reservoir chamber 52 will react against valve disc 230 and when the load on valve disc 230 from the fluid pressure exceeds the biasing load of valve spring 232, valve disc 230 will unseat from piston 210 and fluid will flow from reservoir chamber 52 through rebound fluid passages 226 and into lower working chamber 46. Valve spring 232 is designed to exert a minimum load against valve disc 230 such that rebound valve assembly 212 acts like a check valve during a rebound stroke and does not substantially contribute to the damping loads for shock absorber 20. The damping load during a rebound stroke for shock absorber 20 is created by rebound valve assembly 64 of piston assembly 32.

Compression valve assembly 214 comprises the one or more valve discs 240 and bolt 242. Valve discs 240 close the plurality of compression fluid passages 228 and bolt 242 threadingly engages nut 234 to secure valve disc 240 against piston 210. During a compression stroke of shock absorber 20, the "rod volume" concept requires fluid to flow from lower working chamber 46 to reservoir chamber 52. During the compression stroke, fluid pressure in lower working chamber 46 increases and this fluid pressure reacts against valve discs 240. As the fluid pressure within lower working chamber 46 increases, the fluid pressure reacts against valve discs 240 and eventually valve discs 240 will deflect to open compression fluid passages 228. Fluid will flow from lower working chamber 46, through fluid passages 228 and into reservoir chamber 52. The damping load during a compression stroke is created by compression valve assembly 214. As described above, compression valve assembly 62 of piston assembly 32 acts like a check valve and does not substantially contribute to the damping loads for shock absorber 20. Compression valve assembly 214 is a normally closed compression valve assembly which is opened by the pressure differential between lower working chamber 46 and reservoir chamber 52. The flow through compression valve assembly 214 is directly proportional to the pressure differential. The greater the pressure differential, the greater deflection of valve discs 140 and the greater the flow through compression valve assembly 214.

Pressure sensitive valve assembly 616 comprises a pressure tube cylinder end 650, a valve tube 652, a cylinder end 654, a piston and sleeve assembly 656 and a biasing spring 658 which is illustrated as a Belleville spring. Pressure tube cylinder end 650 is attached to pressure tube 30 and to valve tube 652. Cylinder end 654 is attached to valve tube 652 and engages end cap 54. Piston 210 is attached to piston and sleeve assembly 656, and piston and sleeve assembly 656 is slidably disposed within valve tube 652. A spacer 660 is disposed between piston and sleeve assembly 656 and biasing spring 658. A seal 662 seals the interface between piston and sleeve assembly 656 and valve tube 652. Biasing spring 658 urges piston and sleeve assembly 656 towards pressure tube cylinder end 650. Cylinder end 654 defines one or more apertures 664 which allow fluid flow between lower working chamber 46 and reservoir chamber 52.

During a compression stroke, fluid pressure within lower working chamber 46 acts against the upper side of piston 210. The fluid pressure within reservoir chamber 52 acts against the lower side of piston 210. The biasing load of biasing spring 658 allows for the normal flow of fluid through compression valve assembly 214 as described above as long as the pressure differential across piston 210 does not generate sufficient load to overcome the biasing load of biasing spring 658. Once the pressure differential across piston 210 generates sufficient load to overcome the biasing load of biasing spring 658, piston 210 will cause piston and sleeve assembly 656 to slide down in valve tube 652. As piston and sleeve assembly 656 approaches cylinder end 654, biasing spring 658 will interface with cylinder end 654 to close or prohibit fluid flow from lower working chamber 46 to reservoir chamber 52 through apertures 664. When the fluid pressure difference across piston 210 reduces, biasing spring 658 will again bias piston and sleeve assembly 656 against pressure tube cylinder end 650. As illustrated, biasing spring 658 interfaces with cylinder end 654 but the present disclosure is not limited to this concept as other components could prohibit the fluid flow. Pressure sensitive valve assembly 616 is a normally open compression valve assembly which is closed by the pressure differential between lower working chamber 46 and reservoir chamber 52 where the pressure differential is determined by the velocity of piston assembly 32.

The fluid pressure in lower working chamber 46 exponentially increases and the only flow between lower working chamber 46 and reservoir chamber 52 is through a bypass 666 defined by compression valve assembly 214 and cylinder end 654 or by compression valve assembly 214 and pressure sensitive valve assembly 616. Bypass 666 can include a passage around or through cylinder end 654. The area of bypass 666 and the instantaneous velocity of piston assembly 32 will define the final damping forces achieved. The increase in fluid pressure within lower working chamber 46 is a function of the velocity of piston assembly 32 and thus pressure sensitive valve assembly 616 is a pressure sensitive valve which opens and closes based upon the velocity of piston assembly 32.

Figure 11:
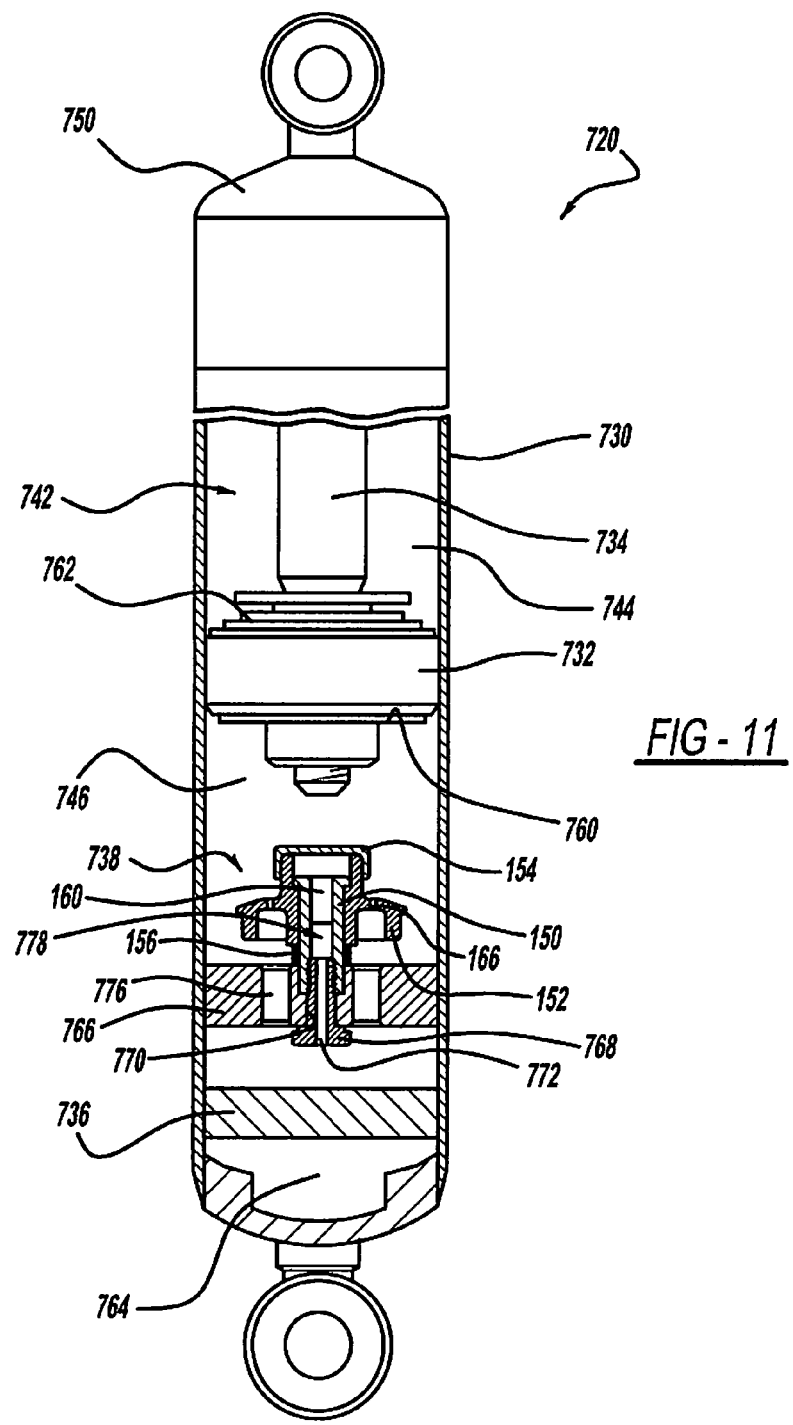
FIG. 11 is a side cross-sectional view of a monotube shock absorber which incorporates the high velocity compression damping in accordance with the present disclosure.

Referring now to FIG. 11, a monotube shock absorber 720 is illustrated. Shock absorber 720 comprises a pressure tube 730, a piston assembly 732, a piston rod 734, an accumulator piston 736 and a pressure sensitive valve assembly 738.

Pressure tube 730 defines a working chamber 742. Piston assembly 732 is slidably disposed within pressure tube 730 and divides pressure tube 730 into an upper working chamber 744 and a lower working chamber 746. A seal is disposed between piston assembly 732 and pressure tube 730 to permit sliding movement of piston assembly 732 with respect to pressure tube 730 without generating undue frictional forces as well as sealing upper working chamber 744 from lower working chamber 746. Piston rod 734 is attached to piston assembly 732 and extends through upper working chamber 744 and through an upper end cap or rod guide 750 which closes the upper end of pressure tube 730. A sealing system seals the interface between rod guide 750, pressure tube 730 and piston rod 734. The end of piston rod 734 opposite to piston assembly 732 is adapted to be secured to the sprung or unsprung portion of vehicle 10. The end of pressure tube 730 opposite to rod guide 750 is adapted to be connected to the other sprung or unsprung portion of vehicle 10.

An rebound valve assembly 760 controls the movement of fluid between upper working chamber 744 and lower working chamber 746 to generate the damping forces during an extension movement of piston assembly 732 in pressure tube 730 as is well known in the art. A compression valve assembly 762 controls the movement of fluid between lower working chamber 746 and upper working chamber 744 to generate the damping forces during a compression movement of piston assembly 732 in pressure tube 730 as is well known in the art. Accumulator piston 736 separates lower working chamber 746 from an accumulator chamber 764 typically filled with a gas. Accumulator piston 736 is slidably disposed within pressure tube 730 and with accumulator chamber 764, accumulator piston 736 compensates for the "rod volume" concept as is well known in the art.

Pressure sensitive valve assembly 738 is a pressure actuated valve assembly which comprises a cylinder end 766, stem 150, spool 152, spool cap 154, valve spring 156 and a bolt 768. The cylinder end 766 may be fixedly secured to the pressure tube 730. Stem 150 is disposed within a central passage 770 extending through cylinder end 766. Stem 150 is secured to cylinder end 766 by bolt 768. Bolt 768 defines a central fluid passage 772 which is in communication with fluid passage 160 in stem 150 to provide a bypass flow of fluid as described below.

Spool 152 is slidingly received over stem 150. Upward movement of spool 152 on stem 150 is limited by flange 162 on stem 150 which engages shoulder 164 defined by spool 152. Valve spring 156 biases shoulder 164 of spool 152 against flange 162 of stem 150 to allow fluid to flow from lower working chamber 46 into a plurality of fluid passages 776 extending through cylinder end 766. Spool cap 154 is secured to spool 152. Spool 152 defines the one or more holes 166.

During a compression stroke, fluid pressure within lower working chamber 46 acts against spool 152 and spool cap 154 of pressure sensitive valve assembly 738. The fluid pressure below cylinder end 766 acts against spool 152 and spool cap 154 of pressure sensitive valve assembly 738. The fluid pressure is channeled to spool 152 and spool cap 154 through bypass passage 778. The biasing of valve spring 156 allows for the normal flow of fluid through the plurality of fluid passages 776 to allow for the normal damping of shock absorber 720 since the fluid flows easily to the area between pressure sensitive valve assembly 738 and accumulator piston 736. Once the pressure differential acting on spool 152 exceeds the biasing load of valve spring 156, spool 152 will slide downward on stem 150 and close or prohibit fluid flow from lower working chamber 46 through the plurality of passages 776. Once the fluid pressure across spool 152 reduces, valve spring 156 will again bias spool 152 upward against flange 162. When spool 152 closes or prohibits fluid flow, the fluid pressure in lower working chamber 46 exponentially increases and the only flow between lower working chamber 46 and the area below cylinder end 766 is through the one or more holes 166. The area of the one or more holes 166 and the instantaneous velocity of piston assembly 732 will define the final damping forces achieved. The increase in fluid pressure within lower working chamber 746 is a function of the velocity of piston assembly 732 and thus pressure sensitive valve assembly 738 is a pressure sensitive valve which opens and closes based upon the velocity of piston assembly 732. Pressure sensitive valve assembly 738 is a normally open compression valve assembly which is closed by the pressure differential between lower working chamber 746 and the area below cylinder end 766 where the pressure differential is determined by the velocity of piston assembly 732.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A shock absorber comprising:
a pressure tube forming a first fluid chamber;
a working fluid disposed within said first fluid chamber;
a piston body slidably disposed within said first fluid chamber, said piston body dividing said first fluid chamber into an upper working chamber and a lower working chamber;
a second fluid chamber in communication with said lower working chamber;
a first fluid valve assembly disposed between said lower working chamber and said second fluid chamber, said first fluid valve assembly allowing direct fluid flow from said second fluid chamber to said lower working chamber while prohibiting fluid flow from said lower working chamber directly to said second fluid chamber;
a second fluid valve assembly disposed between said lower working chamber and said second fluid chamber, said second fluid valve assembly prohibiting fluid flow from said second fluid chamber to said lower working chamber while allowing fluid flow from said lower working chamber to said second fluid chamber;
a pressure sensitive valve assembly including a movable member spaced from the first and second fluid valve assemblies, said movable member of said pressure sensitive valve assembly including at least one hole extending therethrough, and said pressure sensitive valve assembly being disposed between said lower working chamber and said second fluid chamber, and wherein:
said pressure sensitive valve assembly operates independently from a position of said piston body within said first fluid chamber;
a first surface on said movable member of said pressure sensitive valve assembly always being in direct fluid contact with working fluid disposed within said second fluid chamber such that fluid pressure in said second fluid chamber acts directly on said first surface of said pressure sensitive valve assembly;
a second surface of said movable member of said pressure sensitive valve assembly being in direct fluid contact with working fluid disposed within said lower working chamber;
movement of said movable member of said pressure sensitive valve assembly causing said pressure sensitive valve assembly to change from an open position to a closed position, said pressure sensitive valve assembly then restricting fluid flow through said second fluid valve assembly when said pressure sensitive valve assembly is in said closed position such that fluid flow from said lower working chamber to said second fluid chamber is limited by an area of said hole in said movable member; and
said pressure sensitive valve assembly being operable to move between said open and closed positions to control fluid flow through said second fluid valve assembly based upon a pressure differential between pressure of said working fluid in said second fluid chamber reacting against said second surface of said movable member and pressure of said working fluid in said lower working chamber reacting against said first surface of said movable member.

2. The shock absorber according to claim 1, wherein said second fluid chamber comprises a reserve tube surrounding said pressure tube.

3. The shock absorber according to claim 1, wherein said second fluid chamber is defined by said pressure tube, and wherein a piston assembly is slidably disposed in said pressure tube.

4. The shock absorber according to claim 1, wherein said pressure sensitive valve assembly comprises a cylinder end attached to said pressure tube, a spool slidably disposed on said cylinder end, said spool movable between an open position and a closed position and a biasing member urging said spool into said open position, said pressure of said working fluid in said one of said upper working chamber and said lower working chamber urging said spool into said closed position.

5. The shock absorber according to claim 1, wherein said pressure sensitive valve assembly is fixedly secured to said pressure tube.

6. The shock absorber according to claim 1, wherein said pressure sensitive valve assembly defines a fluid passage extending through said first and second fluid valve assemblies.

7. The shock absorber according to claim 1, wherein said pressure sensitive valve assembly comprises a stem, a spool, a spool cap and a spring, said spool cap being said movable member.

8. The shock absorber according to claim 7, wherein said stem defines a portion of a fluid passage extending through said first and second fluid valve assemblies.

9. The shock absorber according to claim 1, wherein said movable member is not a component of the first fluid valve assembly.

10. A shock absorber comprising:
a pressure tube forming a first fluid chamber;
a working fluid disposed within said first fluid chamber;
a piston body slidably disposed within said first fluid chamber, said piston body dividing said first fluid chamber into an upper working chamber and a lower working chamber;
means for defining a second fluid chamber in communication with said lower working chamber;
a first fluid valve assembly disposed between said lower working chamber and said second fluid chamber, said first fluid valve assembly allowing direct fluid flow from said second fluid chamber to said lower working chamber while prohibiting fluid flow from said lower working chamber directly to said second fluid chamber;

a second fluid valve assembly disposed between said lower working chamber and said second fluid chamber, said second fluid valve assembly prohibiting fluid flow from said second fluid chamber to said lower working chamber while allowing fluid flow from said lower working chamber to said second fluid chamber;

a pressure sensitive valve assembly different from the first and second fluid valve assemblies disposed between said lower working chamber and said second fluid chamber, said pressure sensitive valve assembly including a movable member having a hole forming a fluid passage therethrough; wherein said pressure sensitive valve operates independently from a position of said piston body within said first fluid chamber;

a first surface of said pressure sensitive valve assembly always being in direct contact with working fluid disposed within said second fluid chamber;

a second surface of said pressure sensitive valve assembly being in direct contact with working fluid disposed within said lower working chamber;

said pressure sensitive valve assembly is movable from an open position to a closed position based only upon a pressure differential between pressure of said working fluid in said second fluid chamber and pressure of said working fluid in said lower working chamber, said pressure sensitive valve assembly using said hole to limit fluid flow through said second fluid valve assembly when said pressure sensitive valve assembly is in said closed position.

11. The shock absorber according to claim 10, wherein said first and second surfaces are not on a component of said first fluid valve assembly.

12. A shock absorber containing a working fluid, the shock absorber comprising:

a pressure tube forming a first fluid chamber;

a portion of the working fluid disposed within said first fluid chamber;

a piston body slidably disposed within said first fluid chamber, said piston body dividing said first fluid chamber into an upper working chamber and a lower working chamber;

a second fluid chamber in communication with said lower working chamber;

a first fluid valve assembly disposed between said lower working chamber and said second fluid chamber, said first fluid valve assembly allowing direct fluid flow of said working fluid from said second fluid chamber to said lower working chamber while prohibiting fluid flow of said working fluid from said lower working chamber directly to said second fluid chamber;

a second fluid valve assembly disposed between said lower working chamber and said second fluid chamber, said second fluid valve assembly prohibiting fluid flow of said working fluid from said second fluid chamber to said lower working chamber while allowing fluid flow of said working fluid from said lower working chamber to said second fluid chamber;

a pressure sensitive valve assembly different from the first and second fluid valve assemblies disposed between said lower working chamber and said second fluid chamber, the pressure sensitive valve assembly having a fluid chamber which is always in communication with said working fluid in said second working chamber; wherein said pressure sensitive valve assembly further operates independently from a position of said piston body within said first fluid chamber; and a first surface of said pressure sensitive valve assembly being in direct contact with said working fluid disposed within said second fluid chamber;

a second surface of said pressure sensitive valve assembly being in direct contact with said working fluid disposed within said lower working chamber;

said pressure sensitive valve assembly is movable from an open position to a closed position based upon a pressure differential between pressure of said working fluid in said second fluid chamber and pressure of said working fluid in said lower working chamber, said pressure sensitive valve assembly restricting fluid flow of said working fluid through said second fluid valve assembly when said pressure sensitive valve assembly is in said closed position; and said working fluid in direct contact with said first surface always being prohibited from flowing through said second fluid valve assembly and around pressure sensitive valve assembly.

13. The shock absorber according to claim 12, wherein said pressure sensitive valve assembly includes a movable member incorporating the fluid chamber, and wherein said working fluid in direct contact with said first surface is always prohibited by said second valve assembly from flowing around an outside of the movable member.

* * * * *